Feb. 14, 1961  J. G. O'NEIL  2,971,304
INTERLOCKING CONTAINER STRUCTURE AND METHOD
Filed Oct. 17, 1958

INVENTOR.
JOHN G. O'NEIL
BY
ATTORNEYS

United States Patent Office 2,971,304
Patented Feb. 14, 1961

2,971,304

INTERLOCKING CONTAINER STRUCTURE AND METHOD

John G. O'Neil, 5156 Sheridan Ave. S., Minneapolis, Minn.

Filed Oct. 17, 1958, Ser. No. 767,971

3 Claims. (Cl. 53—37)

This invention relates to a disposable container structure, and more specifically to an interlocking bottom structure for such a container. It is desirable to have such a container whereby a sealed chamber is formed between the adjacent bottoms of nested containers. More particularly it is desirable that such a chamber be specifically defined within a confined area within the bottom portion of such a container so that material placed within said chamber will not spread or become scattered over the entire area of the bottom of the container. It is desirable to have such a chamber formed to be very close to the plane of the bottom of the container for receiving material, such as beverage ingredients, therein.

It is an object therefore of this invention to provide a disposable container having a bottom structure adapted to interlock with the bottom of an adjacent container in nested position.

It is another object of this invention to provide a disposable container having a bottom structure having a centrally defined recess therein with said recess extending inwardly of said container.

It is a further object of this invention to provide a disposable container having a bottom structure having an inwardly extending centrally defined recess therein, said recess having an annular groove therein and the outer bottom of said recess having a peripheral rib thereabout with said rib being adapted to be disposed in the annular groove of the recess of an adjacent nested container.

It is also an object of this invention to provide such a container as described, with said recess in said bottom portion of said container forming with its sides a distinct channel with the adjacent side wall of said container.

It is also another object of this invention to provide a method for forming the container described.

These and other objects and advantages of the invention will be fully set forth in the following description made in connection with the accompanying drawings in which like reference characters refer to similar parts throughout the several views and in which.

Figure 1:
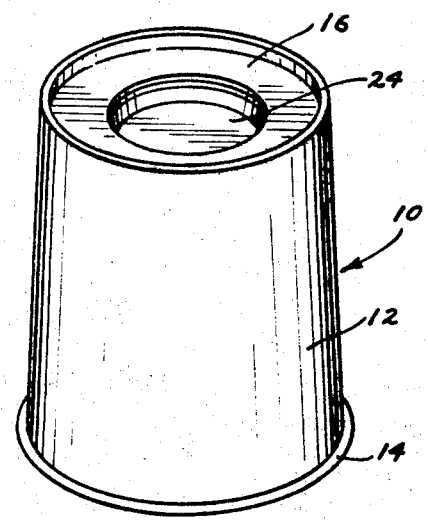
Fig. 1 is a perspective view of applicant's device in inverted position.
Figure 3:
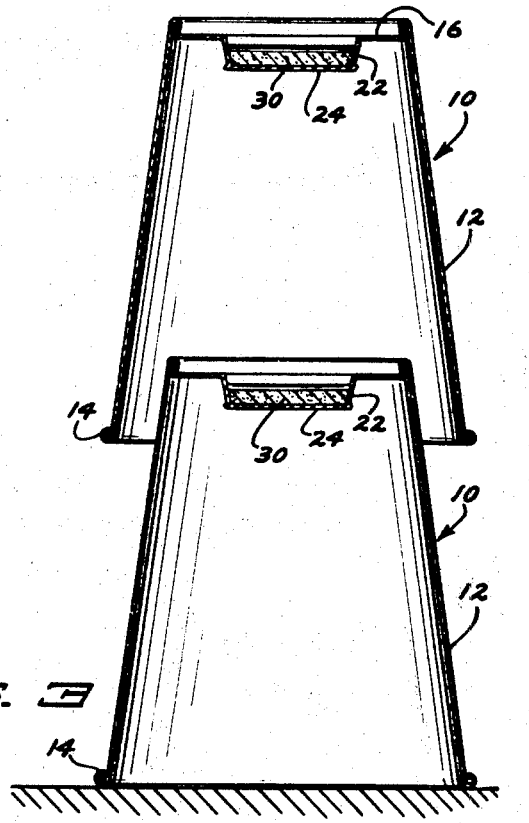
Fig. 3 is an exploded view in vertical section of a pair of applicant's devices in nesting arrangement.
Figure 2:
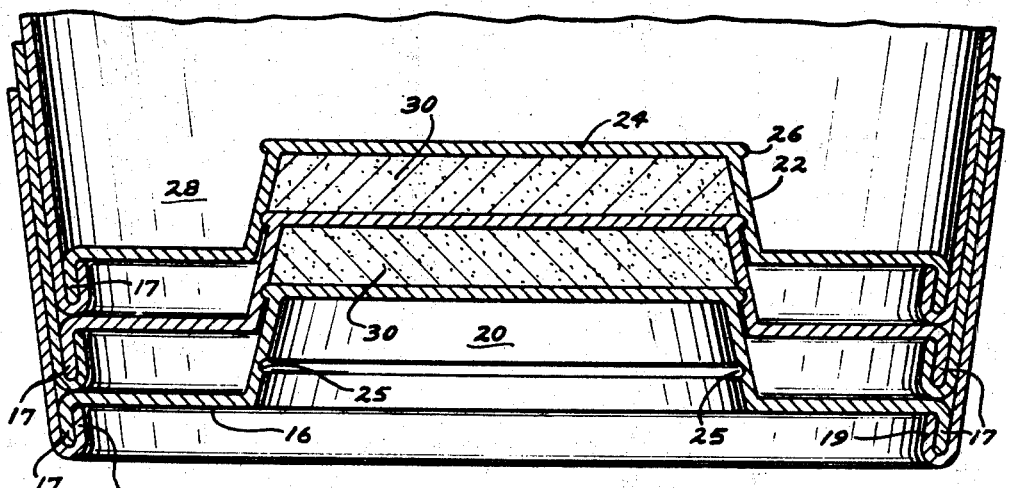
Fig. 2 is a fragmentary view on an enlarged scale in vertical section of plurality of applicant' devices in nested position.

Referring to the drawings, a container 10 is shown. Particular reference is had to a disposable type of container and in a preferred form it is here shown to have a frusto concial body portion 12. Said container may be made of various types of suitable material for containing either hot or cold liquids therein and preferably will be made of a material having some degree of resilience. A bead 14 of a usual type is formed about the upper edge portion of said container. A bottom 16 of said container is formed with a depending peripheral edge portion 17 which is interlocked in a manner well known in the art with a reversely bent bottom edge portion of said body portion 12 in a sealing engagement to form a depending flange 19.

An essential novelty of applicant's container is found in the construction of the central portion of said bottom 16. It is applicant's purpose to provide a container which in nested position will form a central confined sealed chamber particularly adapted for the loading of material therein with the container in inverted position. In view thereof said bottom 16 is here shown formed with a central recess forming a chamber 20. Said chamber extends upwardly into said container 10 and is shown here to be frusto concial in form having a body portion 22 and an end or bottom portion 24. Formed within the side wall of said body portion 22 is an annular groove 25. Said bottom 24 is formed having a peripheral edge portion extending beyond said body portion 22 to form an annular rib 26. Said rib is in the plane of said bottom 24. Said rib will be adapted to be disposed in said groove 25 of an adjacent nested container. Said container 10 will be formed of a material having sufficient resilience for said rib 26 to be frictionally held within said groove 25 and yet to be easily removed therefrom. With the above construction a channel 28 is formed between said body portion 22 and in the inner lower body portion 12 of said container 10.

In operation, applicant's container will be placed in inverted position for having beverage ingredients 30 placed in said chamber 20. For purpose of illustration, a granular form of ingredient is here indicated. Said ingredients 30 are specifically confined within said chamber 20 and the adjacent nested container will be placed over the previous container with said rib 26 being disposed into said groove 25 for a locking engagement. Said chamber 20 is located very near the plane of the bottom of the container or the plane of its top as it were when the container is in inverted position. Thus ingredients are very easily placed within said chamber without having to drop the depth of the container, such as is necessary in the loading of an ordinary container in upright position. The ingredients whether in granular or wafer form in being placed in the container are not scattered over the bottom portion of the container and do not in any way become trapped or crushed under the advancing edge of the adjacent nesting container. Thus the applicant's container is formed to be loaded in a very novel and efficient manner and in nested position the ingredients are disposed within a confined chamber and are positively sealed therein.

For use, the applicant's nested containers will be placed in upright position with the individual containers to be used being removed from the bottom of a stack of nested containers. Thus when the bottom container is removed, the ingredients in said chamber 20 will be resting on the raised bottom portion 22 of said container. Then when liquid is poured into the container, said liquid will sweep the ingredients into said channel 28 where a decided swirling action of the liquid takes place for effectively and quickly dissolving the ingredients. Further a stirring action in said channel 28 more effectively dissolves the ingredients than attempting to mix them in the bottom of an ordinary container. There is relatively a great amount of agitation in said channel 28 for very quickly dissolving said ingredients.

Thus it is seen that I have provided a very unique and novel bottom container structure providing a chamber positioned for a very efficient loading therein of beverage ingredients and for positive interlocking engagement of containers in nested position to positively seal the chambers formed therebetween. Moreover applicant's novel bottom structure lends itself to a very quick and efficient dissolving of the beverage ingredients therein.

It will of course be understood that various changes may be made in the form, details, arrangement and proportions of the device and in the steps and sequence of steps of the method without departing from the scope of applicant's invention, which, generally stated, consists in a method and device capable of carrying out the objects above set forth, such as disclosed and defined in the appended claims.

What is claimed is:

1. An interlocking container structure comprising a walled body portion having an open end, a bottom wall in the other end of said body portion, an inwardly extending projection in said bottom wall extending inwardly of said bottom portion for a short distance and forming a downwardly opening recess, a horizontally disposed groove formed around the inner side of the side walls of said recess and spaced a certain distance inwardly from the open end thereof, a rib formed about the top edge of the outer wall of said recess adapted to be disposed in the groove of a recess of a like nested container for a positive locking engagement whereby a multiplicity of said containers may be securely nested together having chambers of relatively small size formed therebetween.

2. An interlocking container structure comprising a frusto conical body portion being open at one end and having a bottom wall at its smaller end, an inwardly extending frusto conical projection in said bottom wall extending inwardly of said body portion a relatively short distance and forming a downwardly opening recess, an annular groove formed in the walls of said recess spaced a certain distance inwardly from the open end thereof, an annular rib formed about the top edge of the outer wall of said recess adapted to be disposed in said annular groove of a like nested container for a positive locking engagement whereby chambers are formed between nested of said containers and a multiplicity of said containers may be securely nested together in a stacked position.

3. The method of forming and loading an interlocking container structure having an open end, consisting of the steps of inverting said container to have said open end positioned downwardly, forming an inwardly extending projection in the upwardly positioned bottom wall of said container, extending said projection inwardly of said container for a relatively short distance thus forming an open-ended recess, forming an annular groove in the side walls of said recess spaced a certain distance from the open end thereof, forming a rib about the top edge of the outer wall of said recess, said rib being adapted for locking engagement with the groove of a like nested container, placing an ingredient in said recess through the open end thereof, nesting a second container over said first container and having said rib of said second container disposed in said groove of said first container to form a sealed chamber therebetween.

References Cited in the file of this patent
UNITED STATES PATENTS
2,678,143     Dillingham et al. _____ May 11, 1954